United States Patent
Kunjukrishnan et al.

(10) Patent No.: US 12,457,509 B2
(45) Date of Patent: Oct. 28, 2025

(54) REPURPOSING CORRECTIVE ACTIONS AS PREEMPTIVE ACTIONS FOR ADJACENT CLUSTERS OF USER DEVICES

(71) Applicant: T-Mobile USA, Inc., Bellevue, WA (US)

(72) Inventors: Syam Sarasamma Kunjukrishnan, Bellevue, WA (US); Boua Lor, Bellevue, WA (US); Senthil Kumar Mulluppadi Velusamy, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 667 days.

(21) Appl. No.: 17/855,581

(22) Filed: Jun. 30, 2022

(65) Prior Publication Data

US 2024/0007877 A1 Jan. 4, 2024

(51) Int. Cl.
*H04W 24/04* (2009.01)
*H04L 41/14* (2022.01)
*H04L 41/5074* (2022.01)
*G06Q 30/016* (2023.01)

(52) U.S. Cl.
CPC .......... *H04W 24/04* (2013.01); *H04L 41/145* (2013.01); *H04L 41/5074* (2013.01); *G06Q 30/016* (2013.01)

(58) Field of Classification Search
CPC .. H04W 24/04; H04L 41/145; H04L 41/5074; G06Q 30/016
See application file for complete search history.

(56) References Cited

U.S. PATENT DOCUMENTS

| | | | |
|---|---|---|---|
| 6,411,936 | B1 | 6/2002 | Sanders |
| 7,593,904 | B1 | 9/2009 | Kirshenbaum et al. |
| 7,774,299 | B2 | 8/2010 | Wong et al. |
| 7,971,237 | B2 | 6/2011 | Caslin et al. |
| 8,037,449 | B2 | 10/2011 | Iborra et al. |
| 8,082,349 | B1 | 12/2011 | Bhargava et al. |
| 8,214,364 | B2 | 7/2012 | Bigus et al. |
| 8,311,513 | B1 | 11/2012 | Nasserbakht et al. |

(Continued)

FOREIGN PATENT DOCUMENTS

| | | |
|---|---|---|
| CN | 104350775 B | 12/2018 |
| CN | 104335614 B | 3/2021 |

(Continued)

*Primary Examiner* — Rhonda L Murphy
(74) *Attorney, Agent, or Firm* — Perkins Coie LLP

(57) ABSTRACT

The disclosed technology can repurpose a corrective action targeted for an original network device as a preemptive action for other network devices that are adjacent to the original network device. The other network devices are adjacent based on a shared service plan, a common geographic region, or another common criterion. In one example, the system receives an indication of an anomaly (e.g., pattern of activity) causing disruption to a service subscribed to by the user device on a network. The system selects a corrective action that is performed to remediate the disruption. In response to determining that the corrective action remediated the disruption, the system can progressively search adjacent devices for the same pattern of activity and perform the corrective action as a preemptive action for those adjacent devices.

19 Claims, 4 Drawing Sheets

(56) References Cited

U.S. PATENT DOCUMENTS

| | | |
|---|---|---|
| 8,676,937 B2 | 3/2014 | Rapaport et al. |
| 8,769,349 B2 | 7/2014 | Gotesdyner et al. |
| 8,793,363 B2 | 7/2014 | Sater et al. |
| 8,931,101 B2 | 1/2015 | Baluda et al. |
| 9,166,993 B1 | 10/2015 | Liu |
| 9,411,955 B2 | 8/2016 | Jakobsson |
| 9,491,277 B2 | 11/2016 | Vincent |
| 9,615,202 B2 | 4/2017 | Dal Santo et al. |
| 9,660,993 B2 | 5/2017 | Brill et al. |
| 9,699,131 B2 | 7/2017 | Malkin et al. |
| 9,712,576 B1 | 7/2017 | Gill |
| 9,787,781 B2 | 10/2017 | Hofleitner et al. |
| 9,823,994 B2 | 11/2017 | Altman et al. |
| 9,870,715 B2 | 1/2018 | Sadeh-koniecpol et al. |
| 9,924,045 B1 | 3/2018 | Guha et al. |
| 10,048,994 B2 | 8/2018 | Couture et al. |
| 10,083,483 B2 | 9/2018 | Bhakta et al. |
| 10,162,693 B1 | 12/2018 | Contino et al. |
| 10,339,007 B2 | 7/2019 | Hadar et al. |
| 10,341,375 B2 | 7/2019 | Murynets |
| 10,409,665 B2 | 9/2019 | Steiner et al. |
| 10,453,015 B2 | 10/2019 | Chandra et al. |
| 10,554,817 B1 | 2/2020 | Sullivan et al. |
| 10,769,658 B2 | 9/2020 | Carlough et al. |
| 10,938,654 B2 | 3/2021 | Arunachalam et al. |
| 10,963,333 B1 | 3/2021 | Nijim et al. |
| 11,003,641 B2 | 5/2021 | Dundjerski et al. |
| 11,044,332 B2 | 6/2021 | Gauld |
| 11,048,809 B1 | 6/2021 | Sun et al. |
| 11,057,408 B2 | 7/2021 | Roosenraad et al. |
| 11,093,637 B2 | 8/2021 | Olenoski et al. |
| 11,146,573 B2 | 10/2021 | Shtar et al. |
| 11,151,462 B2 | 10/2021 | Jain et al. |
| 11,165,800 B2 | 11/2021 | Thampy |
| 11,269,718 B1 | 3/2022 | Chen et al. |
| 11,271,796 B2 | 3/2022 | Tapia et al. |
| 11,297,078 B2 | 4/2022 | Johnson et al. |
| 11,297,151 B2 | 4/2022 | Holzband et al. |
| 11,363,953 B2 | 6/2022 | Kwatra et al. |
| 2004/0102928 A1 | 5/2004 | Cuddihy et al. |
| 2004/0117624 A1 | 6/2004 | Brandt et al. |
| 2004/0153992 A1 | 8/2004 | Molina-Moreno et al. |
| 2005/0187940 A1 | 8/2005 | Lora et al. |
| 2005/0233733 A1 | 10/2005 | Roundtree et al. |
| 2006/0165040 A1 | 7/2006 | Rathod et al. |
| 2008/0027937 A1 | 1/2008 | Winberry et al. |
| 2008/0301295 A1 | 12/2008 | Malkin et al. |
| 2010/0106542 A1 | 4/2010 | Green et al. |
| 2010/0114946 A1 | 5/2010 | Kumar et al. |
| 2011/0034176 A1 | 2/2011 | Lord et al. |
| 2011/0047072 A1 | 2/2011 | Ciurea |
| 2011/0072506 A1* | 3/2011 | Law ............... H04L 63/1416 726/11 |
| 2011/0231305 A1 | 9/2011 | Winters |
| 2013/0268953 A1 | 10/2013 | Nikankin |
| 2016/0140010 A1 | 5/2016 | Herb |
| 2017/0116338 A1 | 4/2017 | Brunn et al. |
| 2017/0118092 A1 | 4/2017 | Dixon et al. |
| 2017/0346851 A1 | 11/2017 | Drake |
| 2017/0364371 A1 | 12/2017 | Nandi et al. |
| 2017/0372592 A1 | 12/2017 | Neravati et al. |
| 2018/0131810 A1 | 5/2018 | Yokel |
| 2018/0211175 A1 | 7/2018 | Mendels et al. |
| 2019/0028504 A1 | 1/2019 | Shtar et al. |
| 2019/0028557 A1 | 1/2019 | Modi et al. |
| 2019/0122160 A1 | 4/2019 | Kolandaiswamy et al. |
| 2019/0213115 A1 | 7/2019 | Takawale et al. |
| 2019/0238644 A1 | 8/2019 | Chauhan et al. |
| 2019/0268214 A1 | 8/2019 | Maes et al. |
| 2020/0014708 A1 | 1/2020 | Cohen et al. |
| 2020/0120461 A1 | 4/2020 | Lazar et al. |
| 2020/0128047 A1* | 4/2020 | Biswas ............... H04L 67/10 |
| 2020/0202268 A1 | 6/2020 | Retna et al. |
| 2021/0012407 A1 | 1/2021 | Kumar et al. |
| 2021/0073819 A1 | 3/2021 | Hernandez et al. |
| 2021/0241289 A1 | 8/2021 | Roy et al. |
| 2021/0273905 A1 | 9/2021 | Ngo |
| 2021/0409976 A1 | 12/2021 | Ergen |
| 2022/0114593 A1 | 4/2022 | Johnson et al. |
| 2022/0114594 A1 | 4/2022 | Nunes et al. |

FOREIGN PATENT DOCUMENTS

| | | |
|---|---|---|
| EP | 3281144 A1 | 2/2018 |
| EP | 3341884 A1 | 7/2018 |
| EP | 3532916 A1 | 9/2019 |
| EP | 3146431 B1 | 9/2020 |
| EP | 3777292 A1 | 2/2021 |
| JP | 6125628 B2 | 4/2017 |
| JP | 2019107359 A | 7/2019 |
| JP | 6715887 B2 | 6/2020 |
| JP | 2020524855 A | 8/2020 |
| JP | 2020537215 A | 12/2020 |
| JP | 6853172 B2 | 3/2021 |
| KR | 20210132130 A | 11/2021 |
| WO | 2013072232 A1 | 5/2013 |
| WO | 2013106923 A1 | 7/2013 |
| WO | 2013166126 A1 | 11/2013 |
| WO | 2015184184 A2 | 12/2015 |
| WO | 2018029533 A2 | 2/2018 |
| WO | 2018075303 A1 | 4/2018 |
| WO | 2019140091 A1 | 7/2019 |

\* cited by examiner

REPURPOSING CORRECTIVE ACTIONS AS PREEMPTIVE ACTIONS FOR ADJACENT CLUSTERS OF USER DEVICES

BACKGROUND

A customer care center handles customer requests to troubleshoot and repair problems that disrupt services. For example, FIG. 1 is a system diagram 100 that illustrates a customer care center 102 operated by a service provider to administer incoming product or service support or information inquiries from customers. In one example, a customer 104 can use her user device 106 to communicate with the customer care center 102 over a telecommunications network 108. Other modes of communications such as instant messaging or e-mail can occur over a computer network 110, for example.

An initial contact with the customer care center 102 can begin with an interactive voice response (IVR) interaction to accept voice inputs via a speech recognition system. An IVR system can respond with pre-recorded or dynamically generated audio and direct the customer 104 to a human customer service agent 112 that is trained to troubleshoot and repair issues. The computer 116 is connected to a solutions database 120 and/or to the web over the computer network 110 to search for information that can assist the agent 112 to troubleshoot the issue.

A dialogue between the customer 104 and the agent 112 can start with the customer 104 describing a problem and asking for a solution. The agent 112 then searches the solution database 120 to find a relevant solution. The agent 112 can then remotely resolve the problem over the telecommunications network 108 of the computer network 110. The customer care center 102 can receive frequent reports of the same issue from different user devices. As such, the time taken to troubleshoot and repair the same issue repeatedly can have a negative impact on the network while the agent 112 works to address each and every reported issue. Thus, the customer care center 102 cannot efficiently scale to intake reports of issues and remediate the issues in a timely manner.

BRIEF DESCRIPTION OF THE DRAWINGS

Detailed descriptions of implementations of the present invention will be described and explained through the use of the accompanying drawings.

Figure 1:
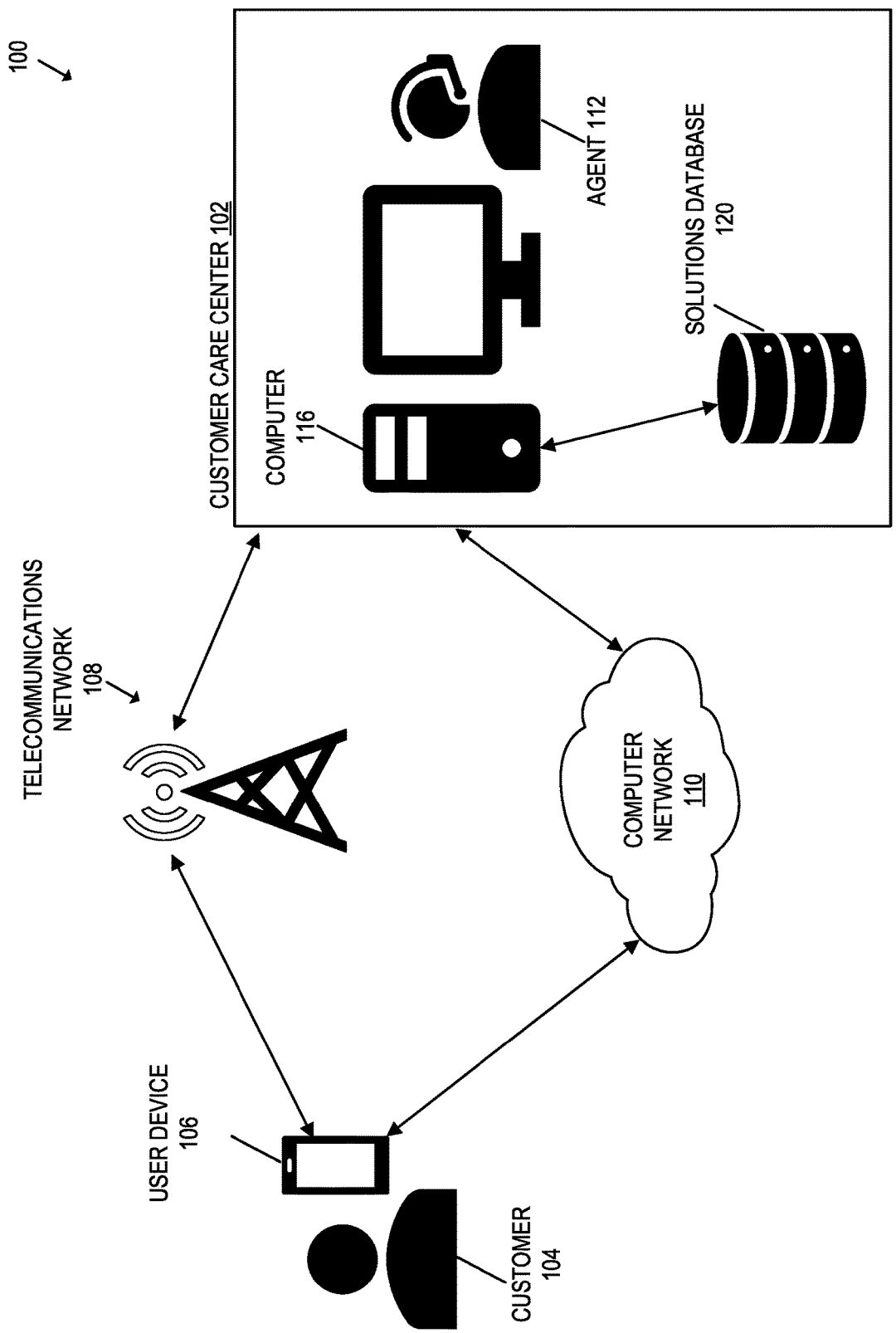
FIG. 1 is a system diagram that includes a customer care center administered by a company to troubleshoot and/or repair issues reported by customers.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Oftentimes, multiple users of a service experience the same kind or type of issues that can be similarly resolved. The issues are typically not identified until reported by customers to the service providers. For example, with any wireless communication service, customers can experience issues that disrupt their service. As a result, frustrated customers need to contact the service provider. An agent manually performs troubleshooting and repair, which consumes time and monetary resources, and affects customer satisfaction. In one example, subscribers of telecommunications networks oftentimes experience technical issues, which are then resolved using the same or similar processes. That is, numerous subscribers contact a service provider regarding the same issue, which results in service disruptions, system congestion, over-utilization of resources, and customer dissatisfaction.

The disclosed technology can proactively identify and fix issues thereby avoiding the need to resolve issues later (e.g., after customers have experienced service disruptions). The technology can automate a significant part of a process to preempt troubleshooting and repairs by proactively identifying issues. In one example, when a user reports a problem, the service provider (e.g., network carrier) performs the troubleshooting. The provider agent finds the issue and performs remediation steps to address the issue. If the remediation steps resolved the issue, the system will check if similar issues are possible, likely, or present for other customers.

The disclosed technology includes a technique for efficiently scanning devices that are more likely to be susceptible to a reported issue. For example, the system can first check adjacent clusters for similar telemetry patterns. In one example, an adjacent cluster for a line is any other line associated with the same account. In another example, an adjacent cluster for an account includes other accounts in close geographic proximity (e.g., same neighborhood). If an analogous pattern of activity is observed for an adjacent account, the same automated fix is applied to that account. As used herein, the term "analogous" can refer to the same pattern identified for the reporting user device or a similar pattern (e.g., substantially similar such as more similar than not). The accounts or related user devices can be monitored as well. If that issue is resolved, the process extends to a next adjacent cluster and so on until the clusters are evaluated and no issues are detected. This process helps to proactively resolve an issue for many customers by scaling the process based on the source that originally reported the issue.

In one example, the disclosed solution can generate a data structure that encodes the telemetry data patterns such as "x number of dropped calls," "data speed below x rate," or "no data." Hence, the data structure is a proof that matches the customer reported issue. For example, the telemetry data can indicate drop calls, throttled data, etc. A mechanism can search for the pattern in other devices based on the data structure. In another example, a message format can represent the corresponding network or other data patterns once the troubleshooting is done. A mechanism can also automatically apply corrective actions represented to different adjacent components (e.g., different account, line, or component). A data structure can also represent the corrective action taken as a series of steps. As a result, the disclosed technology can reduce the number of times that a customer will have to contact a service provider, reduce the need and cost for manual troubleshooting and repair, and reduce customer frustration. Ultimately, the technology can improve uptime of a service and could lead to improved customer satisfaction.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 2:
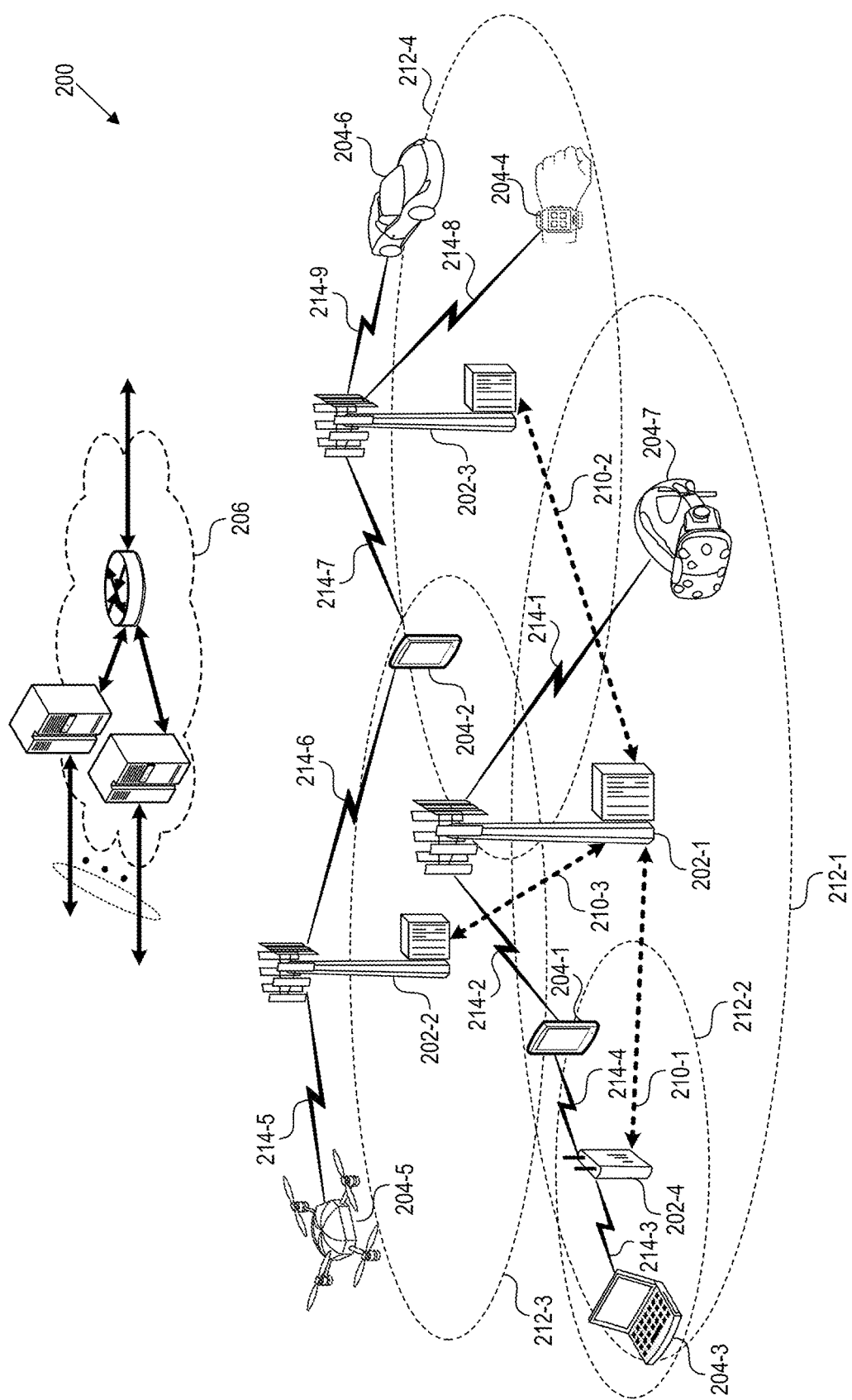
FIG. 2 is a block diagram that illustrates a wireless communications system that can implement aspects of the present technology.

FIG. 2 is a block diagram that illustrates a wireless telecommunication network 200 ("network 200") in which aspects of the disclosed technology are incorporated. The network 200 includes base stations 202-1 through 202-4 (also referred to individually as "base station 202" or collectively as "base stations 202"). A base station is a type of network access node (NAN) that can also be referred to as a cell site, a base transceiver station, or a radio base station. The network 200 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 200 formed by the network 200 also include wireless devices 204-1 through 204-7 (referred to individually as "wireless device 204" or collectively as "wireless devices 204") and a core network 206. The wireless devices 204-1 through 204-7 can correspond to or include network 200 entities capable of communication using various connectivity standards. For example, a 5G communication channel can use millimeter wave (mmW) access frequencies of 28 GHz or more. In some implementations, the wireless device 204 can operatively couple to a base station 202 over a long-term evolution/long-term evolution-advanced (LTE/LTE-A) communication channel, which is referred to as a 4G communication channel.

The core network 206 provides, manages, and controls security services, user authentication, access authorization, tracking, Internet Protocol (IP) connectivity, and other access, routing, or mobility functions. The base stations 202 interface with the core network 206 through a first set of backhaul links (e.g., S1 interfaces) and can perform radio configuration and scheduling for communication with the wireless devices 204 or can operate under the control of a base station controller (not shown). In some examples, the base stations 202 can communicate with each other, either directly or indirectly (e.g., through the core network 206), over a second set of backhaul links 210-1 through 210-3 (e.g., X1 interfaces), which can be wired or wireless communication links.

The base stations 202 can wirelessly communicate with the wireless devices 204 via one or more base station antennas. The cell sites can provide communication coverage for geographic coverage areas 212-1 through 212-4 (also referred to individually as "coverage area 212" or collectively as "coverage areas 212"). The geographic coverage area 212 for a base station 202 can be divided into sectors making up only a portion of the coverage area (not shown). The network 200 can include base stations of different types (e.g., macro and/or small cell base stations). In some implementations, there can be overlapping geographic coverage areas 212 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 200 can include a 5G network 200 and/or an LTE/LTE-A or other network. In an LTE/LTE-A network, the term eNB is used to describe the base stations 202, and in 5G new radio (NR) networks, the term gNBs is used to describe the base stations 202 that can include mmW communications. The network 200 can thus form a heterogeneous network 200 in which different types of base stations provide coverage for various geographic regions. For example, each base station 202 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 200 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 200 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 200 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 204 and the base stations 202 or core network 206 supporting radio bearers for the user plane data. At the Physical (PHY) layer, the transport channels are mapped to physical channels.

Wireless devices can be integrated with or embedded in other devices. As illustrated, the wireless devices 204 are distributed throughout the wireless telecommunications network 200, where each wireless device 204 can be stationary or mobile. For example, wireless devices can include handheld mobile devices 204-1 and 204-2 (e.g., smartphones, portable hotspots, tablets, etc.); laptops 204-3; wearables 204-4; drones 204-5; vehicles with wireless connectivity 204-6; head-mounted displays with wireless augmented reality/virtual reality (ARNR) connectivity 204-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 204-1, 204-2, 204-3, 204-4, 204-5, 204-6, and 204-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 200 equipment at the edge of a network 200 including macro eNBs/gNBs, small cell eNBs/gNBs, relay base stations, and the like. A wireless device can also communicate with other wireless devices either within or outside the same coverage area of a base station via device-to-device (D2D) communications.

The communication links 214-1 through 214-9 (also referred to individually as "communication link 214" or collectively as "communication links 214") shown in network 200 include uplink (UL) transmissions from a wireless device 204 to a base station 202, and/or downlink (DL) transmissions from a base station 202 to a wireless device 204. The downlink transmissions can also be called forward link transmissions while the uplink transmissions can also be called reverse link transmissions. Each communication link 214 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 214 can transmit bidirectional communications using frequency division duplex (FDD) (e.g., using paired spectrum resources) or time division duplex (TDD) operation (e.g., using unpaired spectrum resources). In some implementations, the communication links 214 include LTE and/or mmW communication links.

In some implementations of the network 200, the base stations 202 and/or the wireless devices 204 include multiple antennas for employing antenna diversity schemes to improve communication quality and reliability between base stations 202 and wireless devices 204. Additionally or alternatively, the base stations 202 and/or the wireless devices 104 can employ multiple-input, multiple-output (MIMO) techniques that can take advantage of multi-path environments to transmit multiple spatial layers carrying the same or different coded data.

Preemptive Actions for Adjacent User Devices

Figure 3:
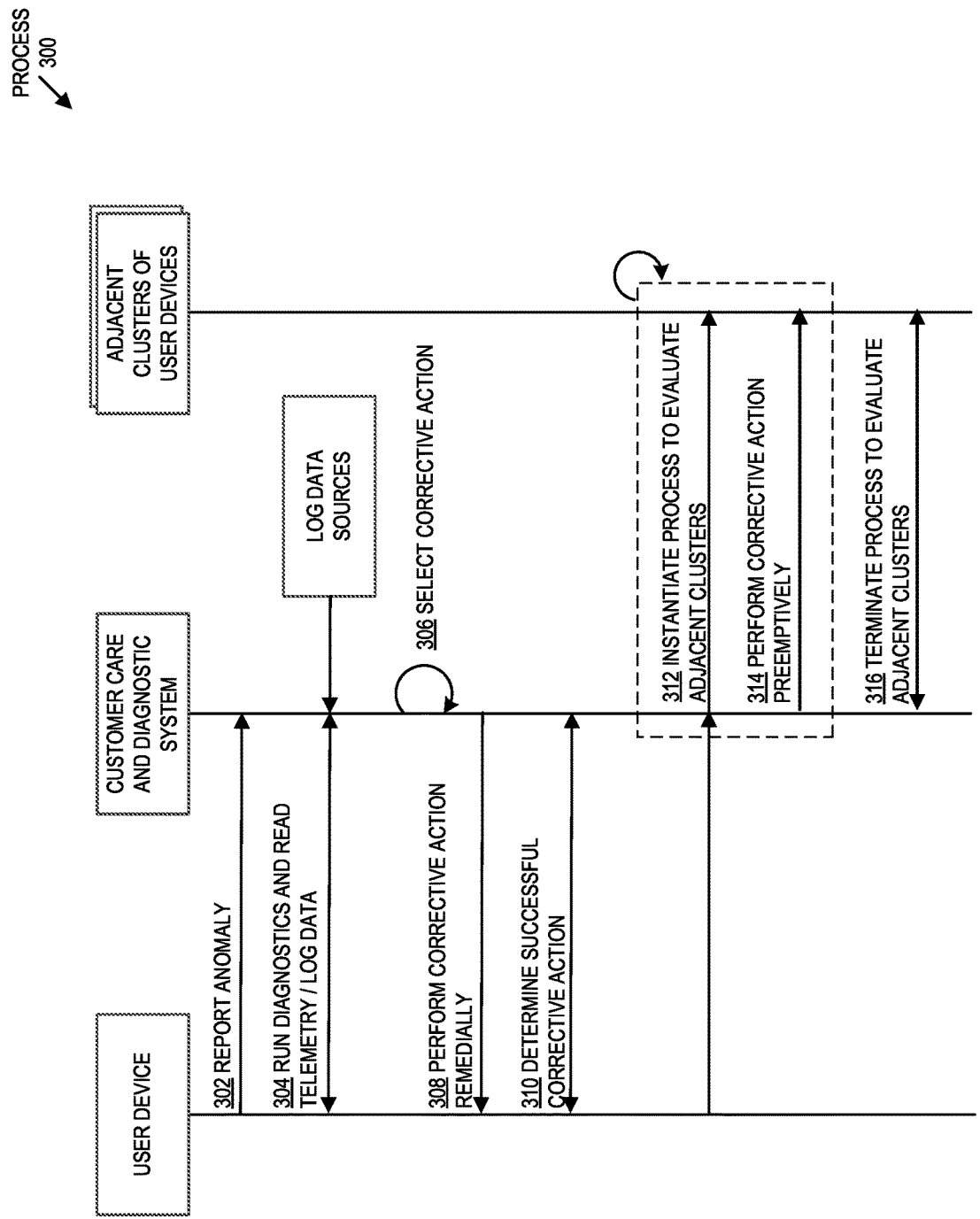
FIG. 3 is a flowchart that illustrates a process for repurposing corrective actions as preemptive actions for adjacent djust user devices.

FIG. 3 is a flowchart that illustrates a process 300 for repurposing a corrective action targeted for one user device as a preemptive action for adjacent user devices on a network (e.g., computer network, telecommunications network, 5G network). The process 300 is performed by a customer care and diagnostic system ("system") which can include one or more servers configured to define successive clusters of adjacent user devices and perform preemptive actions based on corrective actions for anomalies reported by user device. Examples of the user device include a telecommunication device (e.g., smartphone) or any networked device such as a home appliance, IoT device, automobile, or networked machinery.

The process 300 can get triggered in a variety of ways. In one example, the process 300 is triggered when a user is engaged with an interactive voice response (IVR) system and indicates a network issue. In another example, the process 300 is triggered as the user uses a self-service troubleshooting tool/service. In another example, an app running on the background of the user device can detect an anomaly and automatically notify the system and trigger the process 300. In another example, the process 300 is triggered when a user visits a particular webpage or accesses a resource for a threshold number of times. The webpage/resource can relate to a service impact map, coverage map, or other content indicative of a potential issue. In another example, the process 300 is triggered in response to a message about a network issue being posted on a social network site. In yet another example, the process 300 is triggered in response to a specific error being logged.

At 302, a user device reports an anomaly to the system. An example of an anomaly includes a pattern of activity that is unexpected or different from an expected pattern of activity. The anomaly can be reported manually by a user of the user device or reported automatically by the user device such that the reporting is transparent to the user. In one example, the user can use an application on the user device to send an electronic message to the system. The electronic message can include an indication of a disruption to a service subscribed to by the user device. In another example, the user can call an agent of the system to report the anomaly. The anomaly can include an associated pattern of activity that disrupts the service accessible by the user device. Examples of the pattern of activity include a pattern of dropped calls (e.g., a number of dropped calls that exceeds a threshold), a pattern of data speeds below a threshold, or a pattern of dropped data.

At 304, the system can obtain telemetry data of the user device and/or log data from one or more other sources. The telemetry/log data can include or indicate an occurrence of an error. In one example, the user device runs a diagnostics program that generates data forwarded to the system, which can then read the telemetry data. The diagnostics program and/or system can analyze the telemetry data and discover a pattern of activity indicating that calls or data sessions are being dropped, changes in data speeds, or any other anomalous activity. The telemetry/log data can be generated in connection with use of the user device and include network data and connectivity information, configuration information, web browsing data, metadata, data flow information, information about the source and nature of data, types of software or applications installed on the user device, information generated by sensors on the user device or network devices, information related to network traffic patterns, and/or behavior of a user of the user device. The telemetry/log data can be collected periodically and stored centrally at the system.

In one example, error logs are obtained by the system from multiple sources other than (and/or including) the user device. As such, the user device can be one of many types of sources of telemetry/log data. The error data can be obtained from sources such as any network node (e.g., cell tower), the system, existing or new network error tickets, cell tower upgrade or outage events, or the like. For example, a local 5G service outage event can invoke a device repair action or notification in response to device connections being dropped in that area to 4G service until the issue is resolved (e.g., when a cell tower usage is greater than a threshold amount). Once the issue is resolved, another repair action or notification can be triggered to cause the devices to move back to using the 5G service. As a result, a user can avoid getting stuck trying to connect to a 5G service cell tower while the service is down. The evaluation of error data for the user device and adjacent clusters can occur against centralized data.

At 306, the system can select a corrective action configured to mitigate an effect of the anomaly based on the pattern of activity. In one example, the system can generate a detection model based on prior anomalies that define patterns of activities associated with disruptions to services. The system can select, based on the detection model, corrective actions that are predicted to mitigate effects of the anomalies. The detection model is trained based on whether the corrective actions mitigate effects of the anomalies. In one example, the system includes a detection model that can predict a source of the anomaly based on an application of a pattern of activity to a detection model. The detection model is thus configured to predict a corrective action based on, for example, the source of the anomaly. The corrective action can be predicted and selected from among multiple corrective actions.

The disclosed technology can include additional models that implement machine learning techniques to automate (e.g., without agent intervention) and improve performance of the system. A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a detection model can be a neural network with multiple input nodes that receive inputs indicating whether corrective actions successfully remediated anomalies reported to the system and/or inputs indicating whether preemptive actions successfully prevented adjacent user devices from experiencing the same anomalies. The input nodes can correspond to functions that receive the input and produce results. These results can be provided to one or more levels of intermediate nodes that each produce further results based on a combination of lower-level node results.

A weighting factor can be applied to the output of each node before the result is passed to the next layer node. At a final layer, ("the output layer") one or more nodes can produce a value classifying the input that, once the model is trained, can be used to predict corrective actions that can be repurposed as preemptive actions for adjacent user devices. In some implementations, such neural networks, known as deep neural networks, can have multiple layers of intermediate nodes with different configurations, can be a combination of models that receive different parts of the input and/or input from other parts of the deep neural network, or are convolutions; partially using output from previous iterations of applying the model as further input to produce results for the current input.

A model can be trained with supervised learning, where the training data includes feedback from adjacent user devices as input and a desired output, such as anomalies were prevented. A representation of a corrective action, anomalies, and other features can be provided to one or more models. Output from a model can be compared to the desired output for those representations and, based on the comparison, the model can be modified, such as by changing weights between nodes of the neural network or parameters of the functions used at each node in the neural network (e.g., applying a loss function). After applying each of the inputs in the training data and modifying the model in this manner, the model can be trained to evaluate new corrective actions and preemptive actions.

At 308, the system can cause performance of the corrective action to remediate the disruption to the service. A corrective action can include any action performed at or by a node of the network or a user device experiencing the disruption. The action can be automated or require manual input. For example, the system can predict a source of a pattern of activity. In one example, the system detects that the user device is dropping calls because of outdated or faulty software running on user device side or network side. In another example, the anomaly relates to dropped data or messages, which result because a service plan for the user device has incorrect or faulty logic. As such, the corrective actions target the source of the pattern of activity to remove disruptions to the service. The corrective actions can include deploying a software update or patch that causes the user device or network device to update the outdated or faulty software.

In another example, corrective actions target the effects of the pattern of activity rather than the underlying sources. For example, when a user device experiences interruptions or throttling of data services, the system can temporarily change a service plan of the user device to address the disruption and deploy technical staff to investigate the underlying root cause of the disruption. In another example, corrective actions are dynamic and performed immediately upon receiving notification of an anomaly. For example, one or more user device can automatically communicate to the system that calls are being dropped in a particular region. The reports to the system can be transparent to the users (e.g., occurring in the background). In response to the reports, the system can determine that the source of the anomaly is a faulty base station and respond with a corrective action to take the base station offline and reroute services in the same region through other base stations.

At 310, the system can determine that the corrective action remediated the disruption to the service accessible by the user device. In particular, the system can monitor for additional disruptions to the user device that reported the anomaly or monitor the behavior or activity of a source of anomaly such as a network node that was identified as the root cause of dropping calls. As such, the system can track and confirm whether the corrective action has successfully mitigated the effects of the anomaly and/or corrected the fault causing the effects. For example, if no more disruptions have been reported by the user over a period of time (e.g., a week), the system can mark the corrective action as being successful at repairing or restoring the root cause of the fault. In another example, once the corrective action has been performed, the system deems that the corrective action successfully remediated the disruption based on the fact that the source of the disruption was identified and the corrective action was targeted for the identified source. In one example, the system identifies that the source of an anomaly is an outdated and incompatible operating system running on the reporting user device. The system performs a corrective action to update the operating system and then deems (without monitoring) that the corrective action remediated the disruption.

To improve performance of identifying corrective actions, tracking effectiveness of actions, and updating models, the system can encode data structures that represent features used in processes described herein. For example, the system can generate data structures for anomalies or patterns of activities. As such, successive adjacent user devices can be evaluated based on the data structures rather than the original unstructured data or data that is not standardized across user devices. Moreover, the models that are used to select corrective actions can be trained using the data structures, where the models output corrective actions based on an application of a data structure to the model. In other words, the data structures represent pre-processed data for input to the models or as outputs of the models, which improves performance (e.g., reduces latency) of the models because fewer data points are processed to output corrective actions.

At 312, the system can instantiate a process to successively evaluate adjacent clusters of user devices, where each next cluster has a criterion in common with a current cluster. Examples of a criterion include a geographic region that includes a user device or a service plan that is shared with a user device. Two groups of user devices that have a common criterion are adjacent clusters of user devices. The system successively evaluates the clusters of adjacent user devices where cluster N+1 has a criterion in common with cluster N but not necessarily in common with cluster N−1. The system can detect any activity of the adjacent user devices that match the first pattern of activity and cause performance of the corrective action successively for the adjacent user devices.

The system can thus progressively evaluate different adjacent clusters of user devices, to execute the corrective action on any adjacent user devices with patterns of activity that are analogous to the pattern of activity reported as an anomaly. In one example, the system progressively searches adjacent user devices for the pattern of activity and automatically causes performance of the corrective action for any user device of the adjacent user devices having activity that matches the first pattern of activity. The system can identify a next user device that is adjacent to a current user device but not adjacent the original user device. In one example, the system can identify a second user device adjacent to a first user device where the second user device satisfies a criterion in common with the first user device. The system can detect a second pattern of activity of the second user device where the second pattern of activity matches the first pattern of activity. A third user device satisfies another criterion in common with the second user device but not in common with the first user device. As such, the system can detect a third pattern of activity of the third user device and cause performance of the corrective action as a preemptive action for the third user device to mitigate an effect of a third anomaly (e.g., that is analogous to the first anomaly).

At 314, the system can perform (or cause the user device to perform) the corrective action as a preemptive action to mitigate an effect of an anomaly on the adjacent user device (e.g., when the same pattern of activity is detected in association with the adjacent user device). That is, the system can identify adjacent devices that are in the same region or share a common service plan with the user device that originally reported the anomaly, and perform an analogous corrective action for the adjacent devices. For example, the system can cause adjacent devices to update outdated and incompatible software or change network setting of the adjacent devices despite that the adjacent devices have not reported the same or similar anomaly. The adjacent devices may not have reported the same anomaly because the adjacent devices have not experienced analogous anomalies or because the adjacent devices have experienced analogous anomalies but not yet reported them to the system for remedial actions. In another example, the adjacent devices can include other network-side devices that are adjacent to a user device or the source of the disruption. For example, if an outdated software module on a base station is identified as the source of an anomaly, the system can preemptively update the software module on other base stations that have a criterion or criteria in common with the user device or the faulty base station, such as running the same version of the same outdated software module. Accordingly, a corrective action that was identified in response to a reported disruption to one device is performed as a preemptive action for one or more adjacent devices.

At 316, the system can terminate the instance of the process upon detecting that an adjacent cluster lacks any pattern of activity that is analogous to the reported pattern of activity. Therefore, the system evaluates the adjacent clusters of user devices successively by identifying a common criterion or criteria between the current adjacent cluster and other devices, defines the next adjacent cluster based on the devices having the common criterion or criteria, and then evaluates the next adjacent cluster for a pattern of activity. This process continues iteratively based on common criterion/criteria to progressively evaluate devices until the pattern of activity is no longer found in a defined adjacent cluster. At that point, the process for evaluating adjacent clusters ceases. As such, the technology provides a systematic way to improve network performance based on reported issues and in a manner that scales without overburdening system resources.

Computer System

Figure 4:
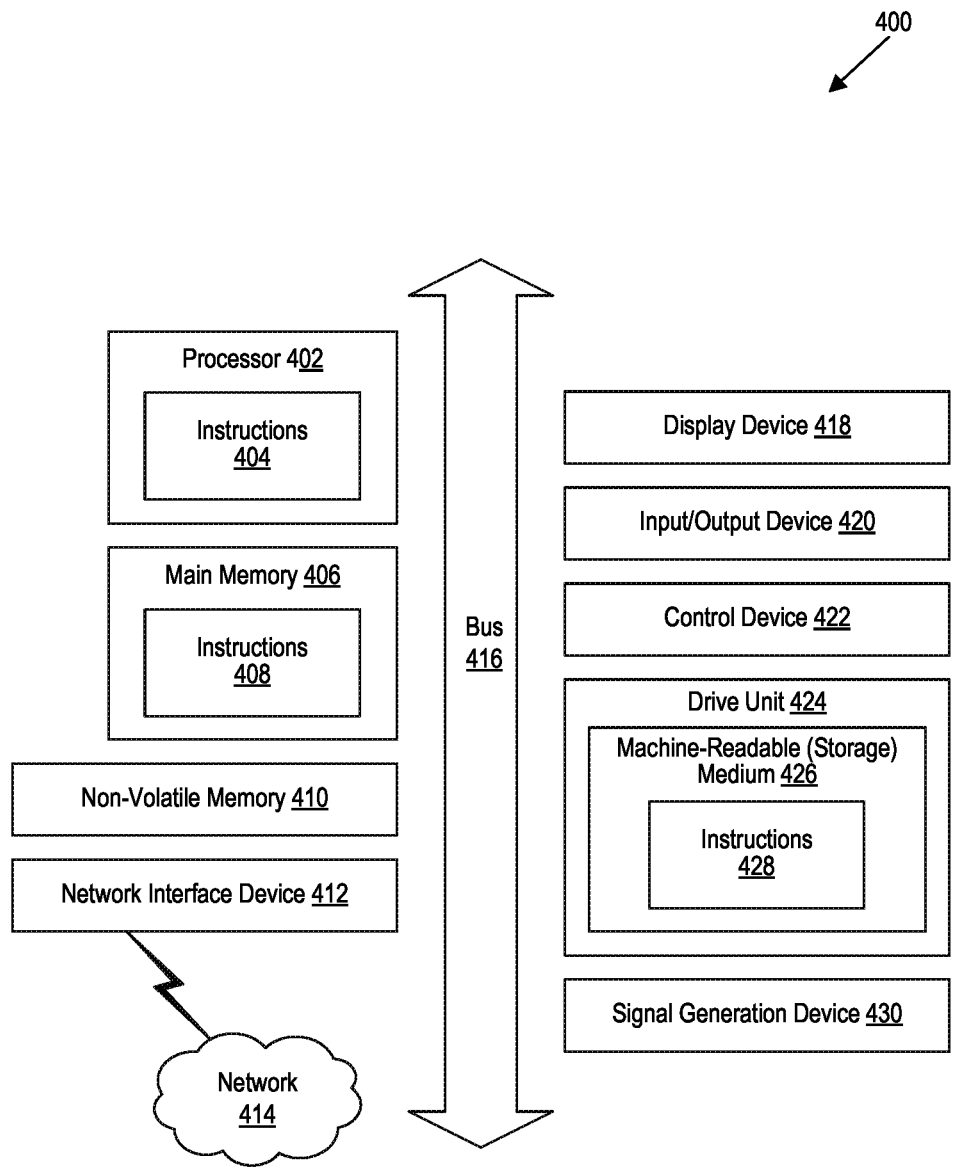
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-readable storage medium, excluding transitory signals and carrying instructions, which, when executed by at least one data processor of a system, cause the system to:
receive an indication of a first anomaly causing disruption to a service subscribed to by a first user device on a telecommunications network,
wherein the first anomaly is reported to the system, and
wherein the first anomaly includes a first pattern of activity that disrupts the service accessible by the first user device;
select a corrective action based on the first pattern of activity of the first anomaly;
cause performance of the corrective action to remediate the disruption to the service accessible by the first user device on the telecommunications network;
determine that the corrective action remediated the disruption to the service accessible by the first user device on the telecommunications network;
in response to the determination that the corrective action remediated the disruption to the service accessible by the first user device:
identify a second user device adjacent to the first user device,
wherein the second user device is defined as being adjacent to the first user device based on having a common criterion;
detect a second pattern of activity of the second user device;
wherein the second pattern of activity is analogous to the first pattern of activity; and
cause performance of the corrective action as a preemptive action for the second user device.

2. The computer-readable storage medium of claim 1, wherein to select the corrective action comprises causing the system to:
predict a source of the first anomaly based on an application of the first pattern of activity to a detection model,
wherein the detection model is configured to select the corrective action based on the source of the first anomaly.

3. The computer-readable storage medium of claim 1, wherein to select the corrective action comprises causing the system to:
progressively search adjacent user devices for the first pattern of activity; and
automatically cause performance of the corrective action as a preemptive action for any adjacent user device that has activity analogous to the first pattern of activity.

4. The computer-readable storage medium of claim 1, wherein the system is caused to, prior to the preemptive action being performed:
define a cluster of adjacent user devices to include any user device within a geographic region that includes the first user device.

5. The computer-readable storage medium of claim 1, wherein the system is further caused to:
identify a third user device that is adjacent to the second user device but not adjacent to the first user device,
wherein the third user device satisfies another criterion in common with the second user device but not in common with the first user device;
detect a third pattern of activity of the third user device;
wherein the third pattern of activity is analogous to the first pattern of activity; and
cause performance of the corrective action as a preemptive action for the third user device.

6. The computer-readable storage medium of claim 1, wherein the system is further caused to:
successively evaluate clusters of adjacent user devices where cluster N+1 has a criterion in common with cluster N but not in common with cluster N−1;
detect activity of the adjacent user devices that are analogous to the first pattern of activity; and
preemptively execute the corrective action successively for the adjacent user devices having activity that is analogous to the first pattern of activity.

7. The computer-readable storage medium of claim 1, wherein the system is further caused to:
instantiate a process to successively evaluate adjacent clusters of user devices, wherein each next cluster has a criterion in common with a current cluster; and
terminate the instance of the process upon detecting that a cluster lacks any pattern of activity that is analogous to the first pattern of activity.

8. The computer-readable storage medium of claim 1, wherein the system is caused to:
encode a data structure based on the first pattern of activity,
wherein the first pattern of activity includes a number of dropped calls that exceeds a threshold, a data speed that is below a second threshold, or an indication that data is not communicated, and
wherein successive adjacent user devices are evaluated based on the data structure.

9. The computer-readable storage medium of claim 1, wherein the system is caused to:
encode a data structure based on the first pattern of activity;
train a detection model based on the data structure, wherein the detection model outputs a particular corrective action based on an application of a particular data structure to the detection model.

10. The computer-readable storage medium of claim 1, wherein the system is caused to:
encode a first data structure based on the first pattern of activity;
encode a second data structure based on the corrective action; and
progressively evaluate different adjacent clusters of user devices based on the first data structure and the second data structure, to execute the corrective action on any adjacent user devices with patterns of activity that match the first pattern of activity.

11. A computer-readable storage medium, excluding transitory signals and carrying instructions, which, when executed by at least one data processor of a system, cause the system to:
select a corrective action to mitigate an effect of an anomaly reported to the system,
wherein the anomaly includes a pattern of activity indicative of a disruption to a service accessible by a user device on a network;
successively define a next adjacent cluster of user devices based on a first criterion in common with a current adjacent cluster of user devices,
wherein the current adjacent cluster of user devices has a second criterion in common with a previous adjacent cluster of user devices but not the next adjacent cluster of user devices;
instantiate a process that progressively evaluates activity of multiple adjacent clusters of user devices and implements the corrective action preemptively on any user device having activity analogous to the pattern of activity,
wherein two groups of user devices that have a common criterion are adjacent clusters of user devices, and
wherein the criterion includes a service plan or a geographic region;
in response to determining that a particular adjacent cluster of user devices of the multiple adjacent clusters of user devices does not include any user device having activity analogous to the pattern of activity, terminating the process of progressively evaluating adjacent clusters.

12. The computer-readable storage medium of claim 11, wherein the system is further caused to:
generate a detection model based on patterns of activities associated with disruptions to services accessible by user devices;
select, based on the detection model, corrective actions that are predicted to mitigate effects of particular patterns of activities; and
train the detection model based on whether the selected corrective actions successfully mitigated the effects of the particular patterns of activities.

13. The computer-readable storage medium of claim 11, wherein the pattern of activity includes a pattern of dropped calls, a pattern of data speeds below a threshold, a pattern of dropped data communications.

14. The computer-readable storage medium of claim 11, wherein the system is caused to:
encode a data representation based on the anomaly; and
train a detection model based on the data representation,
wherein the detection model indicates a corrective action based on an application of a particular data representation of a particular pattern of activity to the detection model.

15. A system comprising:
at least one hardware processor; and
at least one non-transitory memory storing instructions, which, when executed by the at least one hardware processor, cause the system to:
receive an indication of a pattern of activity reported by a networked device on a network,
wherein the pattern of activity relates to a disruption to a service accessible by the networked device;
select a corrective action predicted to mitigate an effect of the pattern of activity including the disruption to the service accessible by the networked device;
determine that the corrective action successfully mitigated the disruption to the service accessible by the networked device;
in response to the determination that the disruption has been successfully mitigated, define an adjacent cluster of networked devices having a criterion in common with the networked device;
progressively define next adjacent clusters of networked devices and evaluate whether any networked devices of each next adjacent cluster are associated with activity that is analogous to the pattern of activity;
apply the corrective action to any networked device of the adjacent clusters to preemptively mitigate disruptions to services; and
terminate the progressive evaluation once any adjacent cluster lacks any networked device associated with activity that is analogous to the pattern of activity.

16. The system of claim 15, wherein the network is a 5G telecommunications network and the criterion is a service plan or a geographic region.

17. The system of claim 15, wherein the indication of the pattern of activity is reported manually by a user of the networked device.

18. The system of claim 15, wherein the indication of the pattern of activity is reported automatically from the networked device, transparent to a user of the networked device.

19. The system of claim 15, wherein the system is caused to:
predict a source of the pattern of activity such that the corrective action targets the source of the pattern of activity.

* * * * *